Feb. 24, 1931.  L. O. B. LINDSTROM ET AL  1,793,859
ELECTRICAL PRUNING DEVICE
Filed Aug. 12, 1929

Inventor:
Linn Olaf B. Lindstrom
David G. Sala

Patented Feb. 24, 1931

1,793,859

UNITED STATES PATENT OFFICE

LINN OLAF B. LINDSTROM AND DAVID G. SALA, OF SAN FRANCISCO, CALIFORNIA

ELECTRICAL PRUNING DEVICE

Application filed August 12, 1929. Serial No. 385,372.

This invention relates to a tree pruning device in which an electric motor is direct connected to a circular saw, the assembly being such that the device can be applied to the branch to be cut and the objects of the invention are, first, to replace the present hand method of pruning trees with an electric power driven circular saw, second, to provide a saw housing that will act as a protective device and also as a support for the saw while the branch is being cut, third, provision for mounting the device on the end of a ground handle so that branches can be cut with the operator on the ground, fourth, provision for allowing the motor and saw assembly to line up with the branch to be cut, fifth, provision for converting the device to direct handling.

Figure 1:
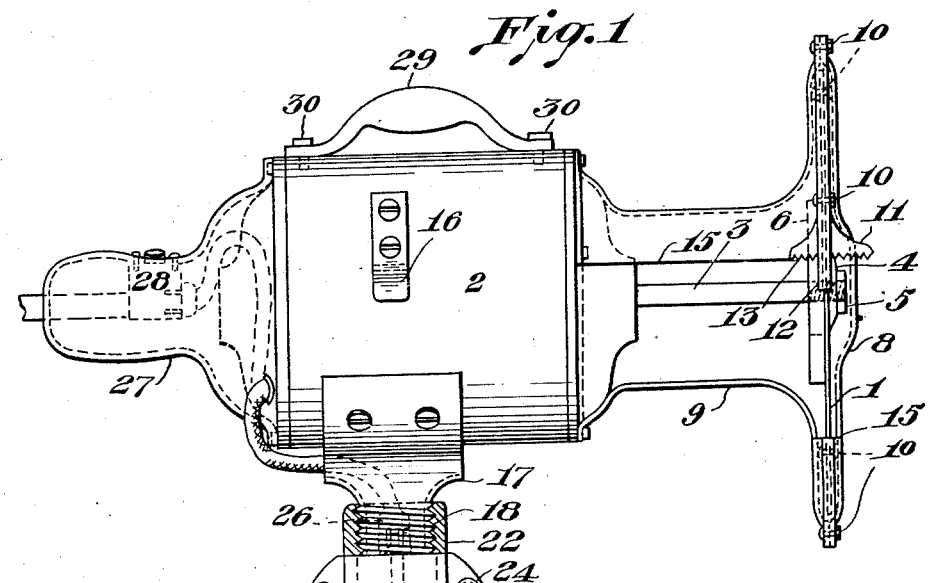
Figure 2:
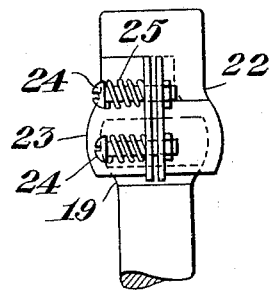
Figure 3:
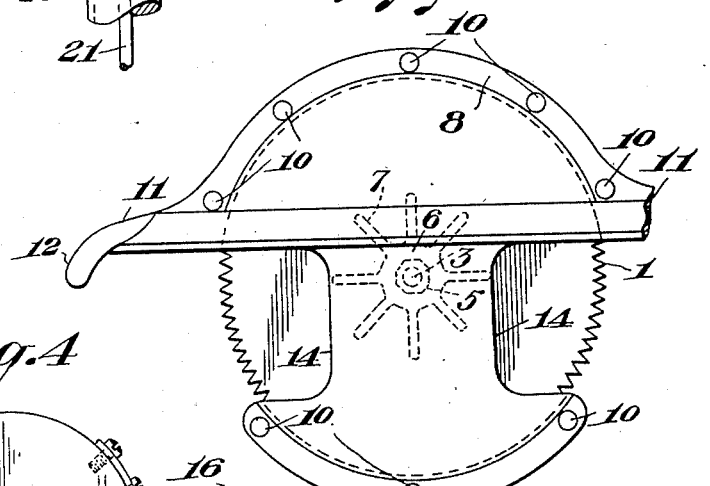
Figure 4:
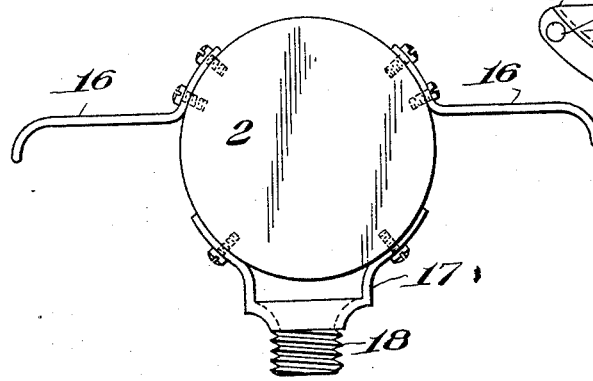

One form of the invention is illustrated in the accompanying drawing, in which Figure 1 is a side view of the entire device; Figure 2, a side view of the universal joint; Figure 3, an end view of the saw housing and support; Figure 4, a view showing the motor supports and end view of the ground handle connection.

The circular saw 1 is direct connected to the motor 2 by means of the shaft 3. The saw is secured to the shaft with the conventional collar 4 and nut 5. The back support 6 for the saw, has vanes 7 which by fan action keeps saw-dust out of the housing and also limits the motor speed on light load.

The saw housing consisting of end section 8 and support section 9 is fastened to the motor with the end bell bolts. The end section 8 and the support section 9 are held together with the connecting bolts 10. The branch saw supports 11—11 are a part of the end section 8 of the saw housing and has the hooks 12—12 to hold to the branch. The grooved surface 13 on the lower side of the support 11 is cut parallel with the long side of the support to aid in holding to the stub end of the branch when the latter is falling. The end section 8 is cut away as shown at 14—14 to allow the saw to go into the branch. For the same reason the housing support section 9 is cut away at 15—15.

The motor end of the device is supported by the branch to be cut with the supports 16—16.

The handle connector 17 secured to the under side of the motor has the threaded section 18 which connects on to the threaded section of the joint. The joint consists of the partial spherical section 19 at the end of the handle 20. The top part of the sphere is cut away to allow the motor supply electrical conductor cord 21 to pass down through the handle. The outer section of the joint 22 has a split half 23 which is fastened to the part 22 by means of the screws 24—24—24—24. The springs 25—25—25—25 on the screws 24—24—24—24 allows adjustment of the flexibility of the joint assembly.

The motor cord 21 has the plug connector 26 in the hollowed handle connector 17.

For direct handling the end handle 27 with switch 28 can be fastened to the motor end bell with the end bell bolts. The top handle 29 is fastened to the top of the motor with the stud screws 30—30.

We are aware that direct connected motor driven saws have been used for other applications and so do not make any claims for this combination.

We do claim:

1. In an electric motor driven pruning device consisting of a motor driving a circular saw mounted on the motor shaft, the combination with a saw guard casing with the upper half extended in the shape of hooks substantially as described for the purpose of resting the device against the branch to be cut and these same hooks having grooves cut in the lower side parallel with the long side of the hooks or supports to prevent slipping along the branch.

2. In an electric driven pruning device consisting of a motor driving a circular saw secured to the motor shaft, the combination with a back support for the saw having vanes to blow out saw dust and limit the motor speed by fan action.

LINN OLAF B. LINDSTROM.
DAVID G. SALA.